(12) United States Patent
Kuzuoka et al.

(10) Patent No.: US 6,466,123 B1
(45) Date of Patent: *Oct. 15, 2002

(54) TEMPERATURE SENSOR AND METHOD OF MANUFACTURING SAME

(75) Inventors: Kaoru Kuzuoka, Toyota; Kozo Takamura, Nagoya, both of (JP)

(73) Assignee: Denso Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,130

(22) Filed: Nov. 20, 1998

(30) Foreign Application Priority Data

Nov. 21, 1997 (JP) .............................................. 9-338085
Oct. 22, 1998 (JP) ............................................ 10-300772

(51) Int. Cl.⁷ ............................ H01C 3/04; H01C 7/02; H01C 7/04
(52) U.S. Cl. ........................ 338/25; 338/22 R; 338/28; 29/610.1; 374/183; 374/185
(58) Field of Search ................................. 338/22 R, 25, 338/28, 243, 239, 99, 34, 13; 73/359 R; 374/185, 135, 140, 183, 163, 179; 29/610.1, 610.2, 610.3

(56) References Cited

U.S. PATENT DOCUMENTS

| | | | | |
|---|---|---|---|---|
| 4,278,828 A | * | 7/1981 | Brixy et al. ................. | 136/232 |
| 4,416,553 A | * | 11/1983 | Huebscher ................... | 374/165 |
| 4,437,084 A | * | 3/1984 | Clayton, Jr. ............... | 338/22 R |
| 4,442,420 A | * | 4/1984 | Novak .......................... | 338/34 |
| 4,929,092 A | * | 5/1990 | Taguchi et al. .............. | 374/183 |
| 4,934,831 A | * | 6/1990 | Volbrecht ..................... | 374/183 |
| 5,161,894 A | * | 11/1992 | Bourigault ................... | 374/185 |
| 5,481,240 A | * | 1/1996 | Fukaya et al. ............. | 338/22 R |
| 5,749,656 A | * | 5/1998 | Boechm et al. .............. | 374/185 |
| 6,164,819 A | * | 12/2000 | Moriwake et al. .......... | 374/185 |
| 6,305,841 B1 | * | 10/2001 | Fukaya et al. .............. | 374/185 |

FOREIGN PATENT DOCUMENTS

| | | | |
|---|---|---|---|
| JP | 51-139377 | | 12/1976 |
| JP | 57-48624 | | 3/1982 |
| JP | 62-278421 | | 12/1987 |
| JP | 1-233333 | * | 9/1989 |
| JP | 1-233334 | * | 9/1989 |

* cited by examiner

*Primary Examiner*—Elvin Enad
*Assistant Examiner*—Kyung S. Lee
(74) *Attorney, Agent, or Firm*—Nixon & Vanderhye PC

(57) ABSTRACT

A temperature sensor has a sensing element (13) consisting of a thermistor (11) and leads (12) and a sheath pin (15) containing core wires (14), to accurately detect temperature. A method of manufacturing such a temperature sensor includes the steps of connecting the leads to the core wires, arranging an insulator (130) around the sensing element, filling the insulator with an inorganic adhesive (135) to fix the sensing element in the insulator, arranging a metal cover (16) around the insulator, and joining an end of the metal cover to an end of the sheath pin.

12 Claims, 4 Drawing Sheets

TEMPERATURE SENSOR AND METHOD OF MANUFACTURING SAME

BACKGROUND OF THE INVENTION

1. Field of the Invention

The present invention relates to a temperature sensor having a sensing element containing a thermistor and a method of manufacturing the temperature sensor.

2. Description of the Related Art

Conventionally, a temperature sensor has a metal tube including a thermistor and leads. In the prior art, the metal tube is filled with insulating powder. When the metal tube is being filled with insulating powder, the thermistor may be displaced. If such a displacement occurs, the temperature detecting characteristic of the temperature sensor changes so that temperature detection with high accuracy cannot be performed. In particular, if the thermistor sensor touches the metal tube due to the displacement of the thermistor, the resistance of the thermistor greatly changes so that accurate detection of temperature cannot be performed.

SUMMARY OF THE INVENTION

An object of the present invention is to provide a temperature sensor capable of correctly detecting temperature and a method of manufacturing such a temperature sensor.

In order to accomplish the objects, according to a first aspect of the present invention, there is provided a method of manufacturing a temperature sensor having a sensing element consisting of a thermistor and leads connected to the thermistor and a sheath pin incorporating core wires. The method includes the steps of connecting the leads to the core wires, arranging an insulator around the sensing element, filling the insulator with an inorganic adhesive to fix the sensing element in the insulator, arranging a metal cover around the insulator, and joining an end of the metal cover to an end of the sheath pin.

The insulator may have an opening through which the inorganic adhesive is poured in. For example, the insulator may have an open end through which the inorganic adhesive is injected into the insulator.

Alternatively the insulator may have a cut at a proper position thereon so that the inorganic adhesive may be injected into the insulator through the cut.

The insulator and the metal cover both may have a shape of a cylinder.

The thermistor may be made of exothermic resistance material whose resistance varies in response to temperature. For example, it may be made of a Cr—Mn—Al oxide or a silicon carbide.

According to the manufacturing method of the first aspect of the present invention, the insulator is arranged around the sensing element, and the insulator is filled with the inorganic adhesive to fix the sensing element in the insulator.

The inorganic adhesive has a fluidity of paste state or the like so that it fills the inside of the insulator without displacing the sensing element. When the inorganic adhesive dries and solidifies, it strongly fixes the position of the sensing element in the insulator.

The insulator around the sensing element secures insulation between the metal cover and the thermistor, thereby preventing the resistance of the thermistor from fluctuating due to external factors. As a result, the temperature sensor correctly measures temperature.

In this way, the temperature sensor manufactured according to the method of the present invention correctly detects temperature.

Since the inside of the insulator is filled with the inorganic adhesive, the sensing element never moves in the insulator. Accordingly, the sensing element is not easily damaged and shows high durability.

The insulator may be made of electric insulation material. For example, it may preferably be made of an oxide-based ceramic such as alumina, mullite, and zirconia, a silicon nitride, or a silicon carbide.

This provides the temperature sensor with high thermal resistance.

According to the second aspect of the present invention, the step of arranging the metal cover around the insulator is preferably carried out by inserting the insulator within the interior of the metal cover after the step of filling the insulator with the inorganic adhesive.

In recent years, a smaller-sized temperature sensor has been desired for use in a detecting system for detecting, for example, a temperature of a catalyser required by regulations concerning exhaust gases. In such a small-sized temperature sensor, the diameter of each of the leads is very small. Therefore, in the small-sized temperature sensor, the leads can be easily cut due to external vibration or impacts which affect various portions to the temperature sensor.

According to the second aspect of the present invention, the inorganic adhesive is filled within the interior of the insulator, and then the insulator is inserted into the interior of the metal cover. As a result, the leads can be fixed with respect to the insulator so that the mechanical vibration of the leads can be prevented. Therefore, even when the leads each having a very small diameter are employed, they are not easily cut.

According to the third aspect of the present invention, the insulator has an open end, and the step of filling the insulator with the inorganic adhesive is carried out by pouring the inorganic adhesive through the open end of the insulator.

As mentioned above, a small sized temperature sensor has been desired in recent years. Such a temperature sensor has the insulator with a small diameter, however, since the end of the insulator is largely opened to have an open end, the inorganic adhesive can be filled through the open end. Therefore, the filling work can be easily performed.

It may also be possible to have an insulator having a shape of cylinder and having both ends opened.

According to the fourth aspect of the present invention, the insulator may preferably have a cut.

When the inorganic adhesive is poured into the insulator through an open end thereof, the cut acts as an air hole to make the adhesive pouring work easier.

The cut may be used to inject the inorganic adhesive into the insulator. In this case, the open end of the insulator acts as an air hole to make the adhesive injection work easier.

A plurality of cuts may also be formed on the insulator. In this case, one of them is used to inject the inorganic adhesive into the insulator, and the others serve as air holes to make the adhesive injection work easier.

According to the fifth aspect of the present invention, the inorganic adhesive may preferably be made of ceramic-based powder and an inorganic binder.

This secures high insulation and vibration resistance for the temperature sensor.

The ceramic-based powder may be made of an oxide-based ceramic such as alumina, mullite, and zirconia, a silicon nitride, or a silicon carbide.

The binder may be water glass or an inorganic binder whose main component is silica.

As the above-mentioned inorganic adhesive, it is preferable to use the one having a coefficient of thermal expansion close to that of the thermistor element or the insulator. By employing such an inorganic adhesive, the generation of cracks in the inorganic adhesive due to the difference in thermal expansions in a high temperature environment can be prevented.

According to the sixth aspect of the present invention, there is provided a temperature sensor consisting of a sensing element composed of a thermistor and leads extending from the thermistor and a sheath pin containing core wires. The leads are connected to the core wires. The sensing element is surrounded with an insulator that is filled with an inorganic adhesive. The insulator is surrounded with a metal cover. An end of the metal cover is joined to an end of the sheath pin.

The insulator around the sensing element secures insulation between the thermistor and the metal cover, thereby preventing the resistance of the sensing element from fluctuating due to external factors.

Consequently, the temperature sensor correctly detects temperature.

In this way, the temperature sensor of the present invention is capable of accurately measuring temperature.

Since the leads are fixed to the insulator by the inorganic adhesive, the leads cannot easily be cut due to external vibration or impact.

This effect can be obtained in particular when the diameter of each of the leads is 0.5 mm or below, or when the outer diameter or the metal cover is 4 mm or below.

According to the seventh aspect of the present invention, the diameter of each of the leads is preferably 0.5 mm or below and a lowering of the performance of response due to an increase in calorific capacity can be prevented.

From the point of view of keeping the strength against vibration, the lower limit of the diameter of the lead is preferably 0.1 mm.

According to the eighth aspect of the present invention, the outer diameter of the metal cover is 4 mm or below. Whereby an effect of a high speed response can be attained.

From the point of view of protecting against vibration, the lower limit of the diameter of the metal cover is preferably 1 mm.

BRIEF DESCRIPTION OF THE DRAWINGS

The above object and features of the present invention will be more apparent from the following description of the preferred embodiments when read in conjunction with the accompanying drawings, wherein.

DESCRIPTION OF THE PREFERRED EMBODIMENTS

For better understanding of the present invention, a prior-art temperature sensor will first be described with reference to FIG. 5 before describing the preferred embodiments.

Figure 5:
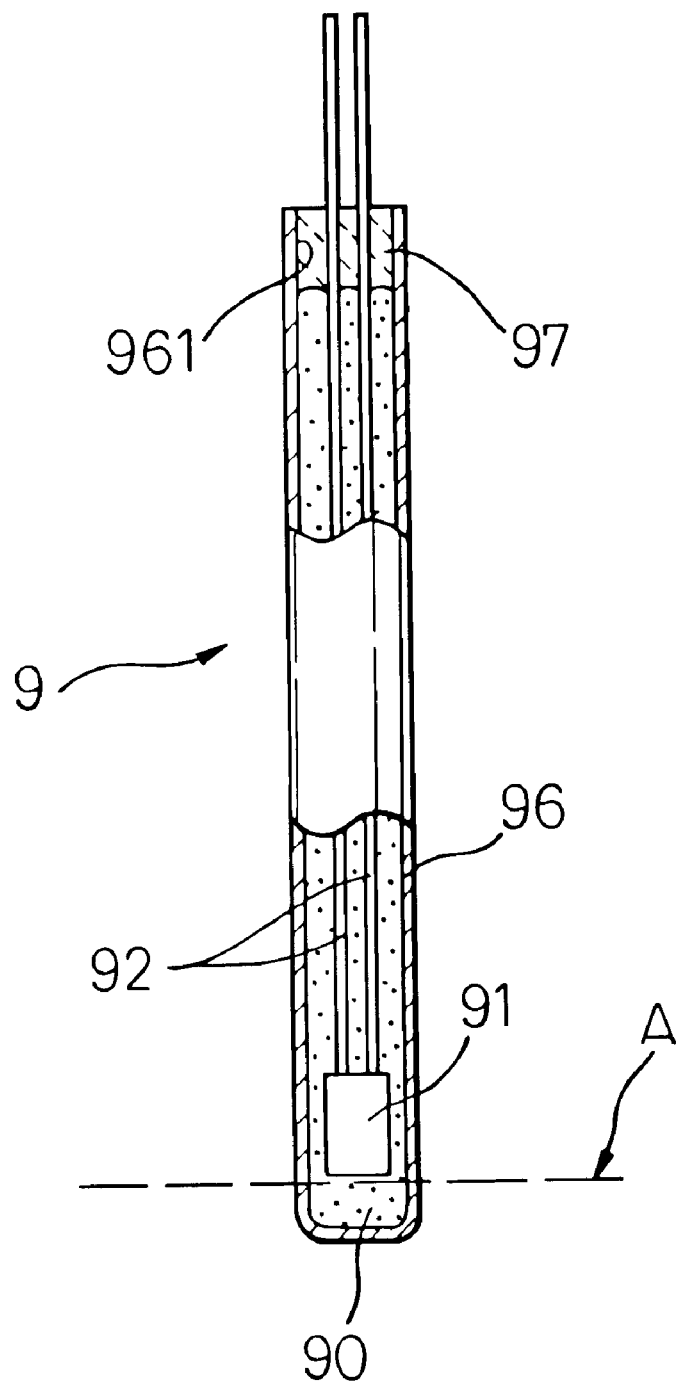
FIG. 5 shows a temperature sensor according to a prior art.

FIG. 5 shows a temperature sensor according to a prior art. This temperature sensor is used for an automobile internal combustion engine and withstands high temperatures.

The temperature sensor 9 has a sensing element incorporated in a metal tube 96. The sensing element consists of a thermistor 91 and leads 92 embedded in and extending from the thermistor 91. The tube 96 is filled with insulation powder 90. A top opening 961 of the tube 96 is sealed with a seal 97. The leads 92 extend outside from the seal 97.

The temperature sensor 9 of this structure shows good heat resistance and withstands mechanical shock such as vibration.

A method of manufacturing the temperature sensor 9 will be explained.

The thermistor 91 in which the leads 92 are embedded is prepared. The metal tube 96 having a closed end and an open end is prepared. The tube 96 is filled with the insulation powder 90 up to a broken-line level A. The thermistor 91 is inserted into the tube 96 and is set on the surface of the powder 90. The leads 92 are extended without sagging to the outside of the tube 96.

The tube 96 is completely filled with the insulation powder 90, and the top opening 961 thereof is sealed with the seal 97.

This method of the prior art fills the metal tube 96 with the insulation powder 90 after placing the thermistor 91 in the tube 96. As a result, the thermistor 91 may be displaced when the powder 90 is poured into the tube 96.

If such displacement occurs, the temperature detecting characteristics of the temperature sensor 9 will change to incorrectly detect temperature. If the thermistor 91 touches the metal tube 96 due to displacement, the resistance of the thermistor 91 greatly changes to incorrectly detect temperature.

The smaller the diameter of the metal tube or each of the leads in the temperature sensor, the more serious the above-mentioned problems become.

Now, the embodiments of the present invention will be described.

Embodiment 1

Figure 1:
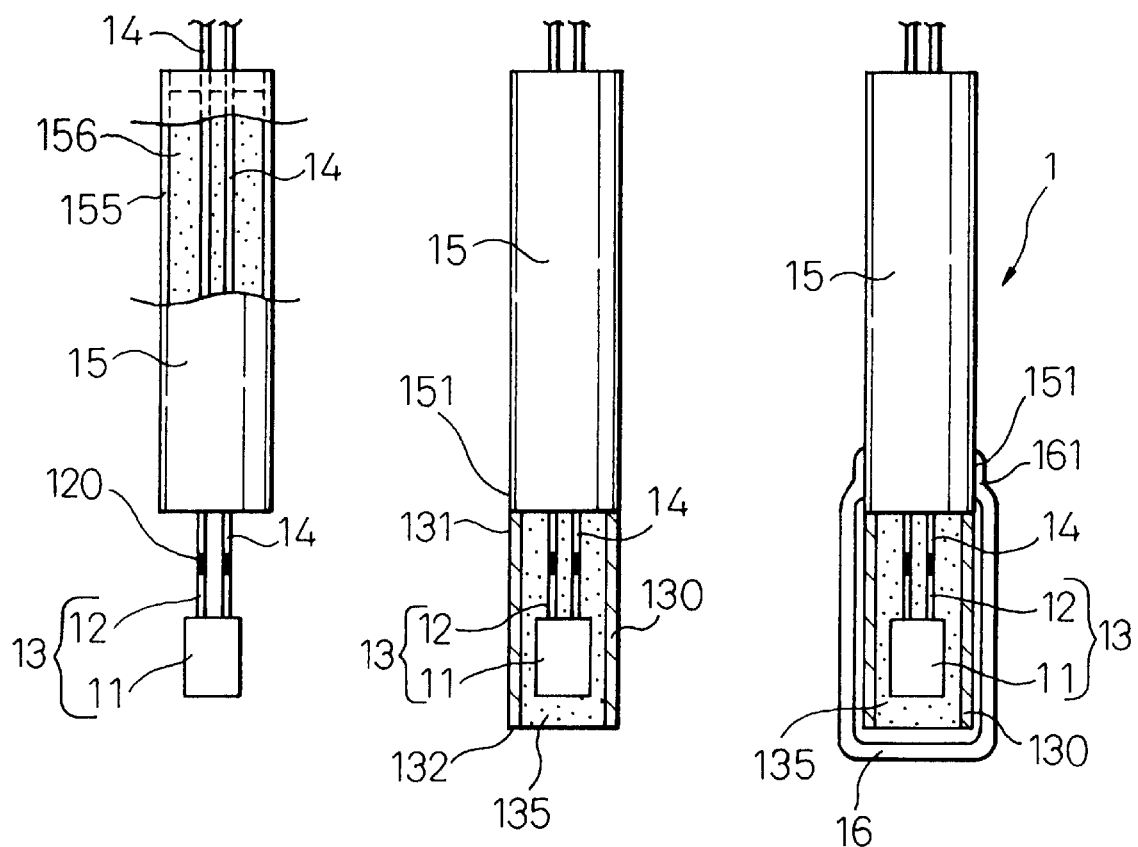
FIGS. 1A to 1C show processes of manufacturing a temperature sensor according to an embodiment 1 of the present invention.

FIGS. 1A to 1C show a method of manufacturing a temperature sensor according to the embodiment 1 of the present invention.

The temperature sensor 1 includes a sensing element 13 and a sheath pin 15. The sensing element 13 includes a thermistor 11 and leads 12 extending from the thermistor 11. The sheath pin 15 contains core wires 14. The diameter of each of the leads 12 is 0.3 mm as an example.

The leads 12 are connected to the core wires 14. An insulator 130 is arranged around the sensing element 13. The interior of the insulator 130 is filled with an inorganic adhesive 135. As a result, the leads 12 are substantially fixed in the interior of the insulator 130.

As the inorganic adhesive 135, smiserum 208B (name of the product) (made by Asahi Kagaku Kougyou Ltd.) having silica including alumina as a main component is used as an example. Smiserum 208B has a coefficient of thermal expansion close to that of the thermistor 11.

A metal cover 16 is arranged around the insulator 130. An end 161 of the cover 16. is joined to an end 151 of the sheath pin 15. The outer diameter of the sheath pin 14 is almost the same as the outer diameter of the insulator 130. The lower end portion of the sheath pin 15 and the upper end portion of the insulator 130 have the same configuration. The outer diameter R of the metal cover 16 is 3 mm as an example, and the outer diameter of the insulator 130 is 2.3 mm as an example.

The insulator 130 has a shape of a cylinder, both ends of which are openings opened to the external world. The metal cover 16 has a shape of a cup having one closed end and another opened end. As shown in FIG. 1C, the insulator 130 is inserted into an interior of the metal cover 16.

A method of manufacturing the temperature sensor 1 will be explained briefly.

As shown in FIG. 1A, the leads 12 of the sensing element 13 are connected to the. core wires 14 of the sheath pin 15. Then, the insulator 130 is arranged around the sensing element 13 and the interior of the insulator 130 is filled with the inorganic adhesive 135 to fix the sensing element 13 in the interior of the insulator 130.

Then, the metal cover 16 is arranged around the insulator 130. After that, the end 161 of the metal cover 16 is joined to the end 151 of the sheath pin 15, to complete the temperature sensor 1.

The manufacturing method will be explained in more detail.

As shown in FIG. 1A, before baking, the leads 12 are inserted into the thermistor 11 made of a Cr—Mn—Al oxide. Then they are baked to form the sensing element 13.

Also, as shown in FIG. 1A, a metal tube 155 made of stainless steel is prepared. The core wires 14 are arranged in the tube 155. Then, the tube 155 is filled with insulation powder 156 made of MgO and is drawn to form the sheath pin 15. The core wires 14 extend to the outside of the sheath pin 15.

Then, as shown in FIG. 1A, the core wires 14 are connected to the leads 12 of the sensing element 13 by laser welding. Numeral 120 in FIG. 1A indicates the welded part.

The insulator 130 made of alumina and having a shape of a cylinder with open ends 132 is prepared. The sensing element 13 is inserted into the insulator 130 through one of the open ends 132 of the insulator 130. The insulator 130 is arranged around the sensing element 13.

The paste of inorganic adhesive 135 is injected into the insulator 130 through the open end 132. The adhesive 135 is then dried and solidified in air to fix the sheath pin 15, sensing element 13, and insulator 130 together.

The insulator 130 is inserted into the interior of the cup-shaped metal cover 16 made of stainless steel. The end 161 of the cover 16 is welded to the end 151 of the sheath pin 15.

This completes the temperature sensor 1.

Figure 2:
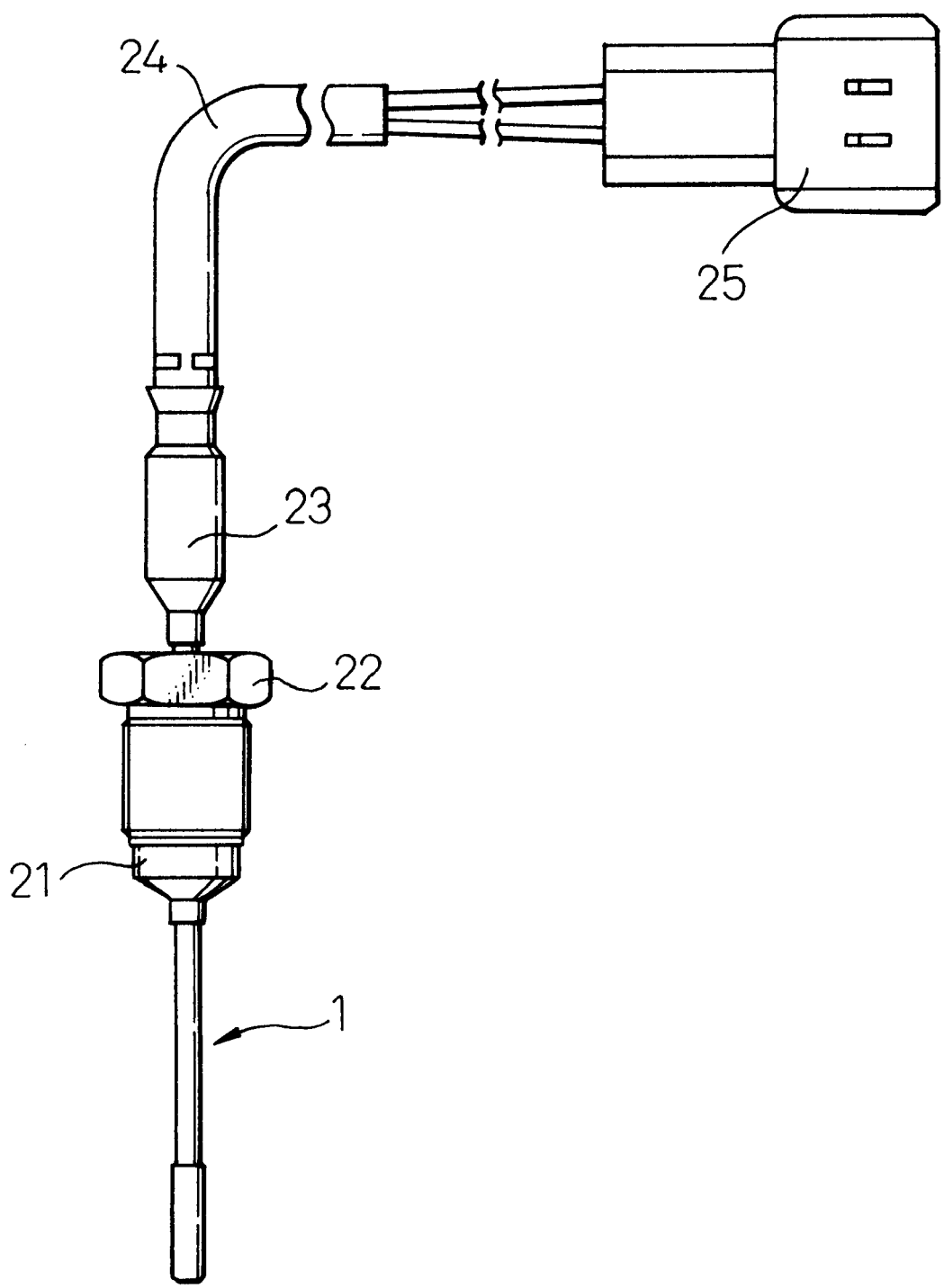
FIG. 2 shows a state of use of the temperature sensor according to the embodiment 1.

In FIG. 2, the temperature sensor 1 is attached to a rib 21 and a nipple 22 when used. The core wires 14 extending from the sheath pin 15 of the temperature sensor 1 are connected to covered leads in a cover 23. The covered leads are passed through a tube 24 and are connected to a connector 25.

The connector 25 is connected to an external power source to apply power to the thermistor 11 of the sensing element 13 to measure temperature.

The effects of the embodiment will be explained.

According to the manufacturing method of the embodiment, the insulator 130 is arranged around the sensing element 13 and the insulator 130 is filled with the inorganic adhesive 135 to fix the sensing element 13 in the insulator 130.

The inorganic adhesive 135 is paste so that it can be poured into the insulator 130 without displacing the sensing element 13 in the insulator 130.

When solidified, the inorganic adhesive 135 fixes the sensing element 13 in the insulator 130 to prevent the sensing element 13 from moving during manufacturing.

Since the inside of the insulator 130 is filled with the inorganic adhesive 135, the sensing element 13 is stationary in the insulator 130 so that the sensing element 13 is hardly damaged and realizes high durability.

Since the filling work of the inorganic adhesive 135 into the insulator 130 is effected through the open end 132, the work can be easily done even when the diameter of the insulator 130 is very small so that it is arranged in the interior of the metal cover 136 having a small diameter of, for example, 3 mm.

Further, the leads 12 are also fixed to the insulator 130 by the inorganic adhesive 135. Since the diameter of each of the leads 12 is as small as, for example 0.3 mm, conventionally, it may easily be cut due to outer vibrations of impact. In contrast, the leads 12 in the temperature sensor 1 according to the present embodiment are not easily cut.

The insulator 130 around the sensing element 13 secures insulation between the thermistor 11 and the metal cover 16 and prevents the resistance of the thermistor 11 from fluctuating due to external factors. As a result, the temperature sensor 1 correctly detects temperature.

In this way, the embodiment 1 provides a temperature sensor capable of accurately detecting temperature and a method of manufacturing such a temperature sensor.

Embodiment 2

Figure 3:
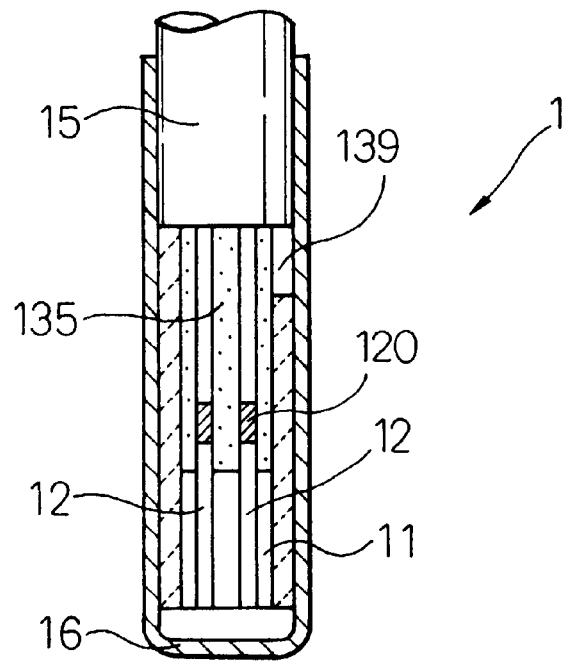
FIG. 3 shows a temperature sensor with an insulator having a cut according to an embodiment 2 of the present invention.
Figure 4:
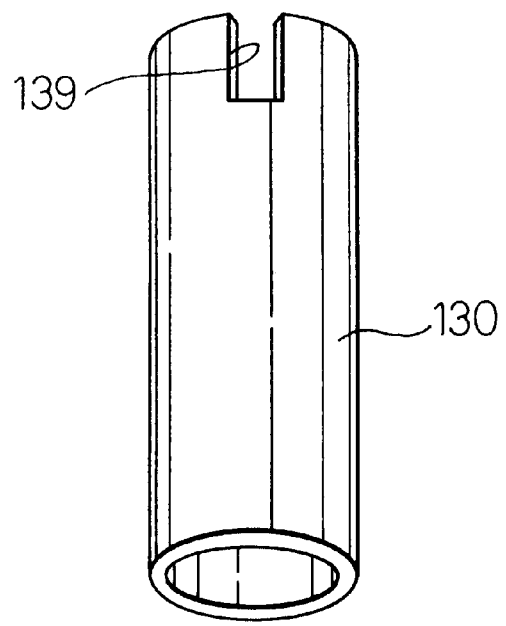
FIG. 4 shows the insulator having a cut of the embodiment 2.

FIGS. 3 and 4 show a temperature sensor according to the embodiment 2 of the present invention. This temperature sensor employs an insulator having a cut.

The temperature sensor 1 has a sensing element 13 and a sheath pin 15. The sensing element 13 consists of a thermistor 11 and leads 12 extending from the thermistor 11. The sheath pin 15 contains core wires 14.

The insulator 130 is arranged around the sensing element 13 and is filled with an inorganic adhesive 135. The insulator 130 is surrounded with a metal cover 16.

The insulator 130 has the cut 139 at an upper end thereof. FIG. 4 is a perspective view showing the insulator 130 with the cut 139.

The other parts of the embodiment 2 are the same as those of the embodiment 1.

A method of manufacturing the temperature sensor 1 of the embodiment 2 is the same as that of the embodiment 1.

The inorganic adhesive 135 is injected into the insulator 130 through an end 132 of the insulator 130. At this time, the cut 139 serves as an air hole to make the adhesive injection work easier.

Other effects of the embodiment 2 are the same as those of the embodiment 1.

It is possible to inject the inorganic adhesive 135 into the insulator 130 through the cut 139. In this case, the end 132 serves as an air hole.

What is claimed is:

1. A method of manufacturing a temperature sensor having a sensing element composed of a thermistor and leads connected to the thermistor and a sheath pin incorporating core wires, comprising:

connecting the leads to the core wires;

an insulator around the sensing element, said insulator having a shape of a cylinder with an open end, a space being formed between said insulator and said sensing element;

filling said space with an inorganic adhesive from said open end to fix the sensing element in the insulator;

solidifying said inorganic adhesive in air to fix said sheath pin;

arranging a metal cover around the insulator; and joining an end of the metal cover to an end of the sheath pin.

2. A method of claim 1, wherein the step of arranging the metal cover around the insulator is carried out by inserting the insulator within the interior of the metal cover after the step of filling the insulator with the inorganic adhesive.

3. A method of claim 2, wherein the insulator has an open end, and filling the insulator with the inorganic adhesive is carried out by pouring the inorganic adhesive through the open end of the insulator.

4. A method of claim 1, wherein the insulator has an open end, and filling the insulator with the inorganic adhesive is carried out by pouring the inorganic adhesive through the open end of the insulator.

5. A method of claim 4, wherein the insulator has a cut at an end thereof.

6. A method of claim 5, wherein the inorganic adhesive is made of ceramic-based powder and an inorganic binder.

7. A method of claim 6, wherein the insulator has a cut at an end thereof.

8. A method of claim 7, wherein the inorganic adhesive is made of ceramic-based powder and an inorganic binder.

9. A method of claim 1, wherein the diameter of each of the leads is 0.5 mm or less.

10. A method of claim 1, wherein the outer diameter of the metal cover is 4 mm or less.

11. A method of manufacturing a temperature sensor having a sensing element composed of a thermistor and leads connected to the thermistor and a sheath pin incorporating core wires, comprising:

connecting the leads to the core wires;

arranging an insulator around the sensing element;

filling the insulator with an inorganic adhesive to fix the sensing element to the insulator;

arranging a metal cover around the insulator; and joining an end of the metal cover to an end of the sheath pin, wherein the step of arranging the metal cover around the insulator is carried out by inserting the insulator within the interior of the metal cover after the step of filling the insulator with the inorganic adhesive, wherein the insulator has an open end, and filling the insulator with the inorganic adhesive is carried out by pouring the inorganic adhesive through the open end of the insulator, and wherein the insulator has a cut at an end thereof.

12. A method of claim 11, wherein the inorganic adhesive is made of ceramic-based powder and an inorganic binder.

* * * * *